Patented June 15, 1943

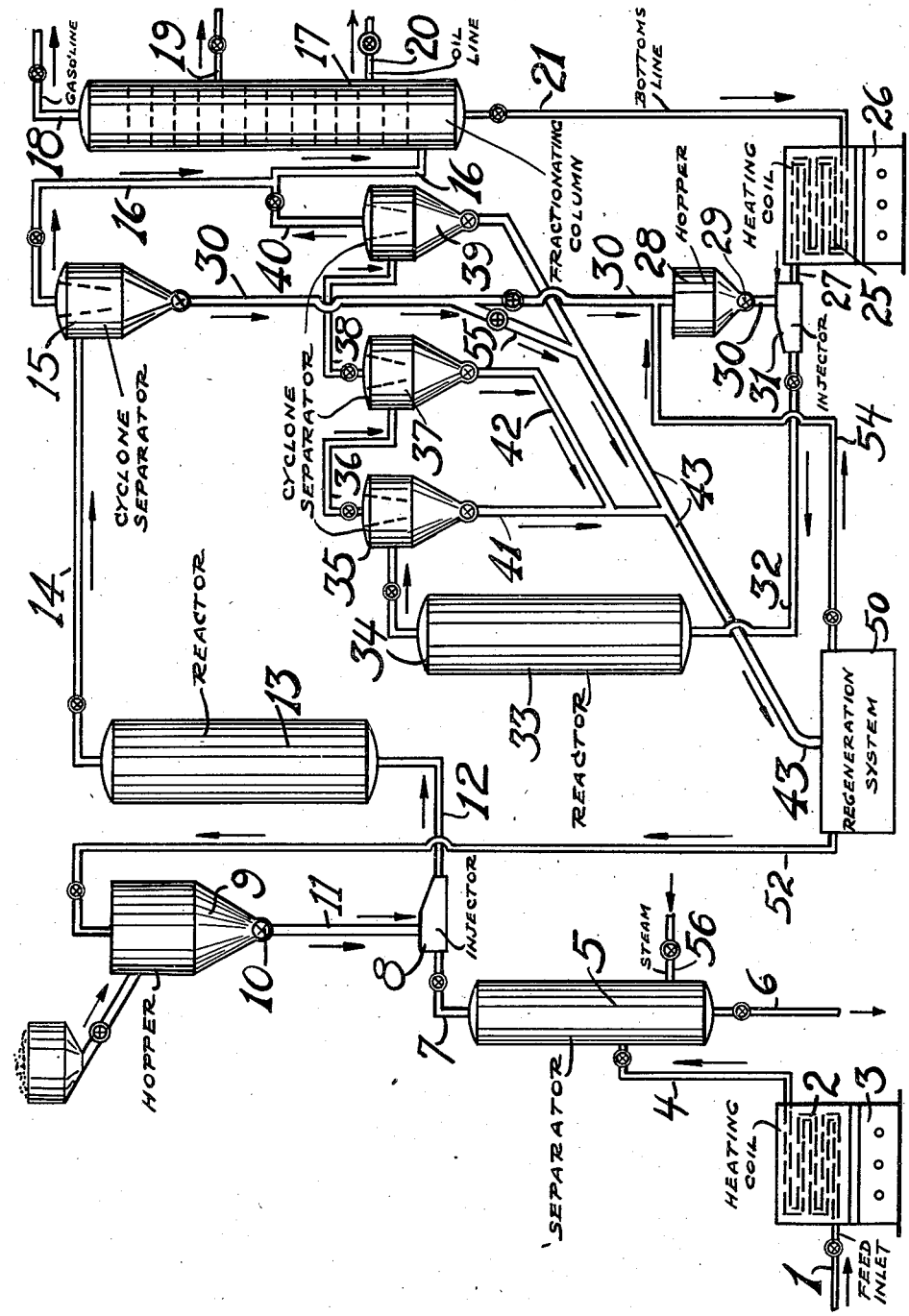

2,322,019

UNITED STATES PATENT OFFICE 2,322,019

ART OF TREATING HYDROCARBONS

Charles E. Hemminger, Westfield, N. J., assignor to Standard Oil Development Company, a corporation of Delaware Application February 10, 1940, Serial No. 318,274

3 Claims. (Cl. 196—52)

The present invention relates to the art of treating hydrocarbons. More particularly, the present invention relates to a two-stage continuous catalytic hydrocarbon oil converting or cracking process in which unconverted residue from the first stage is catalytically treated under more drastic conditions in a second stage.

It is a primary object of the present invention to carry into effect a catalytic conversion in which hydrocarbons containing a catalyst suspended therein are caused to pass through a reaction zone, the reaction products are fractionated and a relatively high boiling fraction which is recovered from the fractionator is heated, mixed with catalyst and passed through a second reaction zone, and then commingled with the products from the first reaction zone in the fractionator.

A supplementary feature of the above stated object regards carrying out the second reaction at a higher temperature and in the presence of more catalyst than that used in the first reaction.

It is a further object of the present invention to carry out the process so that relatively low conversions to gasoline per passage through the reaction zones are obtained, i. e., conversions of 30% to 35% based on the original feed in the first stage, and about 20% based on its feed in the second stage. Light gas oil or heating oil is a product of equal importance to gasoline in the second stage cracking.

It is another object of the present invention to crack a gas oil to produce a greater percentage of heating oil than is ordinarily produced.

Other further advantages of the present invention will appear from the ensuing description.

A better understanding of the present invention will be had by setting forth a concrete example in which a gas oil is processed under certain definite conditions of temperature, pressure, and the like.

The accompanying drawing represents diagrammatically a combination of apparatus elements in which the present invention may be successfully performed.

Referring to the drawing in detail, in connection with a concrete example, a gas oil having a gravity of about 25° A. P. I. is introduced into the system through line 1, and then discharged into coil 2 located in a furnace 3. In this furnace the oil is heated to a temperature of say about 850° F. to 950° F., and at this temperature, and at a pressure of say about 15–20 lbs. per square inch gauge, it is withdrawn from coil 2 through line 4 and discharged into a flash pot or separator 5 from which the unvaporized portion may be withdrawn through line 6, which latter material may be used as a heavy fuel oil or as feed stock for a viscosity breaking process. Superheated steam at a temperature of 800° F. to 1000° F. may be discharged into vessel 5 through line 56 to aid the vaporization. The vapors are withdrawn through line 7 and admixed in injector 8 disposed in said line 7 with a catalyst fed into said injector from hopper 9 through star feeder 10 and line 11. The catalyst which is preferably in the form of powder of a size such that 97% will pass through a 100 mesh screen, and all of it will remain on a 250 mesh screen, may be at a temperature of about 1000° F., in the case where it has been just previously regenerated. The amount of catalyst, which is added to the oil, may be about say 1 lb. of catalyst per cubic foot of vapors, the latter measured under the conditions of operation. The catalyst itself may be an acid-treated clay, or it may be other alumina-silica or magnesia-silica compositions, natural or synthetic. The hydrocarbon vapors which emerge from injector 8 through line 12 contain catalyst suspended therein and these vapors are discharged into the bottom of an insulated drum 13 where they remain for a period of say 5 to 25 seconds in order to permit the desired conversion. The reaction products are withdrawn through line 14 and passed into a cyclone separator 15 where the greater portion of the catalyst, say about 99%, is separated from the vapors, whereupon the vapors are discharged through line 16 into fractionating column 17. From fractionating column 17 cracked gasoline vapors are recovered overhead through line 18, and these vapors are transferred to a condenser and receiving drum (not shown). Through line 19 a relatively low boiling heating oil is recovered. A somewhat higher boiling heating oil is withdrawn through line 20. These fractions are more refractory than the charging stock, since they, as will hereinafter appear, contain oil which has been recycled two or more times. The fraction withdrawn through line 19 has a boiling range of about 400° F. to 625° F. and constitutes a good No. 2 heating oil or a Diesel oil. The fraction withdrawn through line 20 may be used as a heavy distillate heating oil or blended with pitch from line 6 to yield a residual fuel oil of desired viscosity characteristics. The bottoms from fractionator 17 are withdrawn through line 21 and passed into a fired coil 25 disposed in the furnace 26 where the oil is heated to a temperature within the range of from about 900° F. to 1050° F., under a pressure of about 15–25 lbs. per square inch gauge, and this material is then withdrawn through line 27, forced through injector 31 where catalyst withdrawn from hopper 28 through star feeder 29 and transfer line 30 is simultaneously introduced into said injector, and in this manner a suspension of the catalyst in the vapors is effected. The catalyst in hopper 28 may be regenerated catalyst, but preferably is a mixture of unregenerated catalyst and regenerated catalyst. The catalyst which is separated from the vapors in cyclone separator 15 may be transferred directly through line 30 into hopper 28 and there admixed with a fresh or regenerated catalyst. The amount of catalyst which is dispersed in the vapors in injector 31 is somewhat more than that employed in the first stage of the process; for instance, from 2–5 lbs. of catalyst per cubic foot of vapors measured at reaction temperature may be dispersed in the vapors passing through injector 31. The vapors containing the catalyst suspended therein are withdrawn from injector 31 through line 32 and discharged into a second reactor 33 where they remain for say 5–50 seconds. The reaction products are withdrawn from the reactor 33 through line 34 and passed through three cyclone separators in series. That is to say, the vapors first pass into cyclone separator 35 where a portion of the catalyst is withdrawn from the vapors, then pass through line 36 into a second cyclone separator 37 where a further portion of the catalyst is withdrawn from the vapors, and finally pass through line 38 into the third cyclone separator 39 where substantially the last traces of catalyst are removed from the vapors, which vapors are then returned to the fractionating column 17 through lines 40 and 16, respectively. Unconverted high boiling gas oils from reactor 33 are separated in column 17 and either recycled to reactor 33 or withdrawn through line 20 from tower 17.

The process just now described results in a yield of about 35%, or thereabouts, of gasoline in reactor 13, and about 15% based on the original feed is produced in reactor 33, so that approximately 50% of the gas oil fed to the system through line 1 is converted to cracked gasoline.

The present invention does not depend for novelty on means for transferring the catalyst recovered from cyclone separator 15 to hopper 28, or transferring it from the cyclone separators 35, 37, and 39 to the regeneration unit 50 illustrated diagrammatically. In general, I believe that the best method for transferring the catalyst from one point to another is by gasiform means; that is to say, the catalyst withdrawn from cyclone separator 15 may be suspended or fluidized by steam and conveyed by transfer line 30 to hopper 28, and in a similar manner the catalyst recovered from the separators 35, 37, and 39 may be conveyed to the regeneration system 50, through the proper line or lines 41, 42 and 43 and from the regeneration system to hoppers 9 and/or 28 through transfer lines 52 and/or 54. By manipulation of the valves in lines 55 and 30 a part or all of the catalyst from separator 15 may be transferred to hopper 28 to improve the flexibility of the process. Furthermore, the regeneration of the catalyst may be accomplished by known means, and preferably this is accomplished by dispersing the unregenerated catalyst in a heated gas containing free oxygen, whereupon the carbonaceous deposits which contaminate the catalyst may be consumed by combustion.

In order to show the difference between my process, as hereinbefore set forth, as to results, and a one-stage cracking operation, the following data are submitted:

|  | Gasoline | Heating oil | Heavy cycle oil | Coke |
| --- | --- | --- | --- | --- |
|  | Per cent | Per cent | Per cent | Per cent |
| I. One-stage | 50 | 23 | 23 | 5.5 |
| II. My process | 50 | 33 | 15 | 4.7 |

The above data were secured from runs using the same charging gas oil in run I and run II. It will be noted that more heating oil and less coke is obtained according to my process. It will also be noted that any highly refractory oil may be withdrawn from fractionator 17 through lines 19 and 20, which means that higher overall conversion to desired products is possible.

It will be understood that numerous modifications of the present invention may be made without departing from the spirit thereof and that the precise details hereinbefore set forth in the concrete example are purely illustrative. For instance, the temperature in the first stage of my process may vary from say 800° F. to 1000° F., the pressure may vary from substantially atmospheric in reaction drum 13 to 100 lbs. per square inch gauge, although best results are secured from operating at a temperature of about 850° F. and pressure of about 5 lbs. per square inch gauge in this stage of the process. It is within the scope of this invention, also, to vary the amount of catalyst employed in the first stage of the process, that is to say, the amount of catalyst may vary from 0.5 to 3 lbs. per cubic foot of oil vapors. As regards the second stage of my process, the temperatures may vary from about 900° F. to 1050° F., while the pressure should usually be of the order of those employed in the first stage, generally being somewhat less. The best results are obtained by employing a temperature of about 950° F. in this second stage of my invention. As hereinbefore stated, the amount of catalyst used in the second stage is greater than that employed in the first stage, because the material in line 21 is generally more refractory than the virgin stock in line 12. Therefore, the amount of catalyst which is contained in the vapors in reaction drum 33 should be somewhere within the limits of from 1–10 lbs. of catalyst per cubic foot of oil vapors.

The invention claimed is:

1. In a vapor phase catalytic treatment of hydrocarbons, in which a powdered catalyst is suspended in the hydrocarbon vapors undergoing treatment, the improvement which comprises causing the reaction to be carried out in the first stage of the process in the presence of catalyst, separating the catalyst from the vapors, conducting the vapors to a fractionating zone, withdrawing the highest boiling fraction from said zone, admixing catalyst therewith, reacting said highest boiling fraction in a reaction zone at a substantially higher temperature and in the presence of a greater quantity of catalyst than used with the hydrocarbons reacted in the first named reaction zone, and returning the products from the second reaction zone to the said fractionating zone.

2. In a vapor phase catalytic treatment of hydrocarbons, in which a powdered catalyst is suspended in the hydrocarbon vapors undergoing treatment; the improvement which comprises causing the reaction to be carried out in the first stage of the process in the presence of catalyst, separating the catalyst from the vapors, conducting the vapors to a fractionating zone, fractionating the vapors in said fractionating zone to separate a gasoline fraction, a light distillate fraction boiling between about 400° F. and 625° F. and a heavier fraction, admixing said heavier fraction with finely divided catalytic material, reacting said last-named fraction in a reaction zone at a substantially higher temperature and in the presence of a greater quantity of catalyst than used in the initial treatment of said hydrocarbons carried out in the first stages of said process, and passing cracked products from the second reaction zone to said fractionating zone.

3. In a process for vapor phase catalytic cracking of hydrocarbon oil in which the oil to be cracked is passed through a reaction zone in contact with powdered active catalytic cracking material; the improvement which comprises passing the oil to be cracked through an initial cracking zone containing said catalytic material maintained at active cracking temperature, keeping said oil in contact with said catalyst in said initial cracking zone for a period sufficient to effect not more than 35% of said oil into gasoline constituents, thereafter separating the catalyst from the cracked products, fractionating the cracked products to segregate a gasoline fraction and a heavier fraction, passing said heavier fraction through a second cracking zone, contacting said heavier fraction during passage through said second cracking zone with a materially greater quantity of catalyst than is maintained in said first-named cracking zone, keeping said second-named cracking zone at a temperature materially above the temperature maintained in said first-named cracking zone, maintaining said oil in said second-named cracking zone for a period sufficient to obtain substantial cracking thereof, and thereafter passing products from said second-named cracking zone to said fractionating zone.

CHARLES E. HEMMINGER.